United States Patent
Kabasawa

[11] Patent Number: 6,104,571
[45] Date of Patent: Aug. 15, 2000

[54] HEAD DEVICE HAVING AN IMPROVED AIR BEARING SURFACE TO ATTENUATE A TURBULENT AIR FLOW

[75] Inventor: Hidetoshi Kabasawa, Saitama-Ken, Japan

[73] Assignee: Teac Corporation, Tokyo, Japan

[21] Appl. No.: 09/189,467

[22] Filed: Nov. 10, 1998

[30] Foreign Application Priority Data

Nov. 11, 1997 [JP] Japan ................................. 9-308807

[51] Int. Cl.$^7$ .................................................. G11B 21/21
[52] U.S. Cl. ............................................................ 360/103
[58] Field of Search ........................... 360/97.01, 99.01, 360/103, 104, 125, 126

[56] References Cited

U.S. PATENT DOCUMENTS

| | | | |
|---|---|---|---|
| 4,974,106 | 11/1990 | White et al. ............................. | 360/102 |
| 5,065,500 | 11/1991 | Yoneda et al. ......................... | 29/603.12 |
| 5,267,108 | 11/1993 | Tani ........................................ | 360/103 |
| 5,270,889 | 12/1993 | Muratomi ................................ | 360/103 |
| 5,345,353 | 9/1994 | Krantz et al. ........................... | 360/103 |
| 5,404,256 | 4/1995 | White ...................................... | 360/103 |
| 5,479,306 | 12/1995 | Ananth et al. .......................... | 360/103 |
| 5,488,527 | 1/1996 | Komori et al. .......................... | 360/122 |
| 5,610,784 | 3/1997 | Dorius et al. ............................ | 360/103 |
| 5,708,540 | 1/1998 | Ananth et al. .......................... | 360/103 |
| 5,751,517 | 5/1998 | Agarwal ................................... | 360/103 |
| 5,793,568 | 8/1998 | Smith ....................................... | 360/103 |
| 5,815,346 | 9/1998 | Kimmal et al. .......................... | 360/103 |
| 5,841,608 | 11/1998 | Kasamatsu et al. .................... | 360/103 |
| 5,870,251 | 2/1999 | Boutaghou .............................. | 360/103 |
| 5,991,118 | 11/1999 | Kasamatsu et al. .................... | 360/103 |
| 6,023,393 | 2/2000 | White ...................................... | 360/103 |

FOREIGN PATENT DOCUMENTS 5-210932  8/1993  Japan .

*Primary Examiner*—Jefferson Evans
*Attorney, Agent, or Firm*—Eugene Lieberstein; Michael N. Meller

[57] ABSTRACT

A head device includes a slider which is supported by a supporting plate. A head portion is provided on the slider and reads information from or writes information to a storage medium. The slider has an air bearing surface confronting the storage medium. The head portion is formed on the air bearing surface of the slider. The head device is levitated from the storage medium by an air flow between the storage medium and the head device when accessing the storage medium. The head device includes an air flow disturbing unit which attenuates a turbulent air flow produced on an air-outlet side of the slider when the storage medium is rotated at a speed above a predetermined speed. The air flow disturbing unit maintains a distance between the storage medium and the head device at a constant level.

8 Claims, 9 Drawing Sheets

FIG. 1
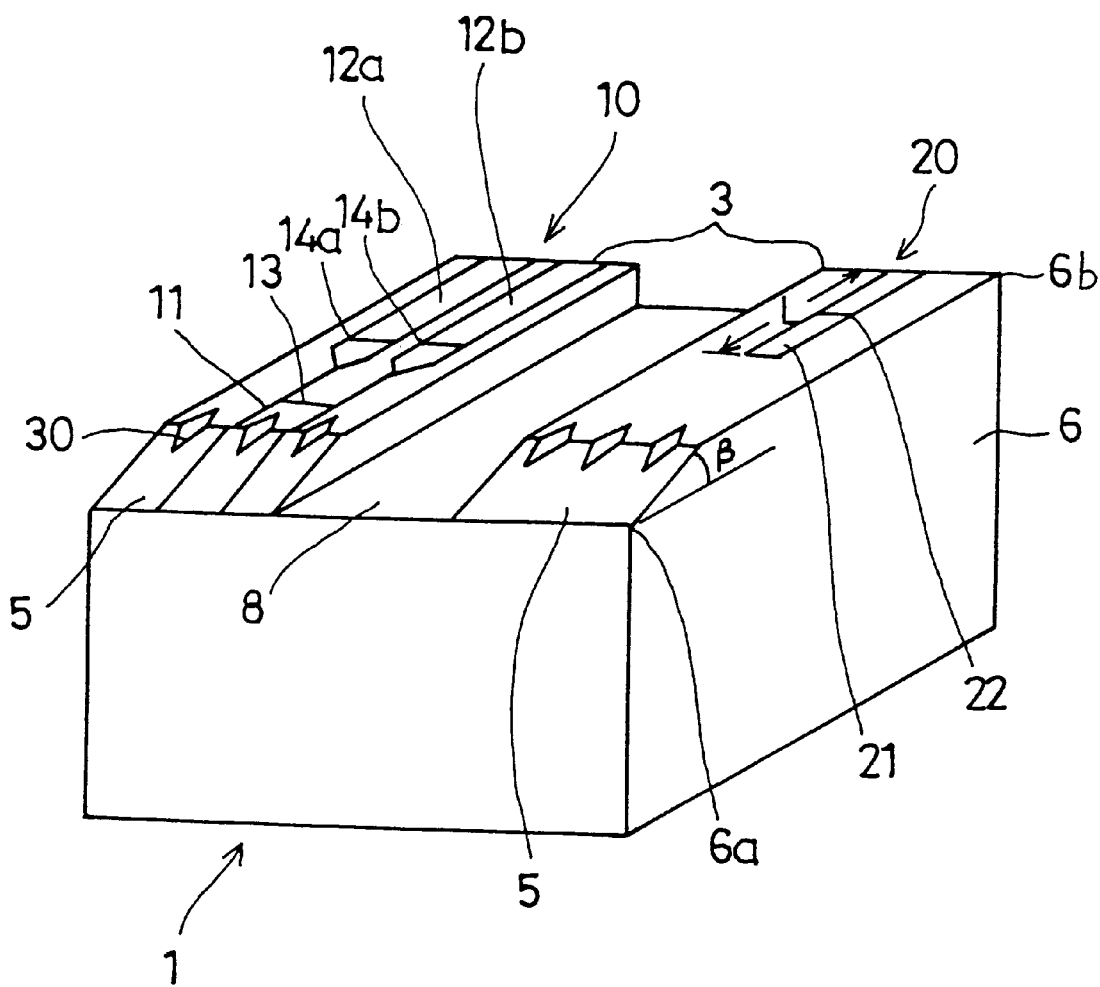
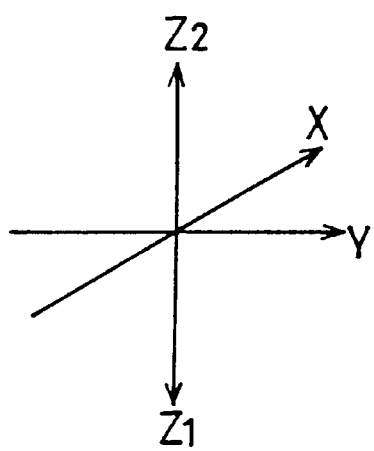

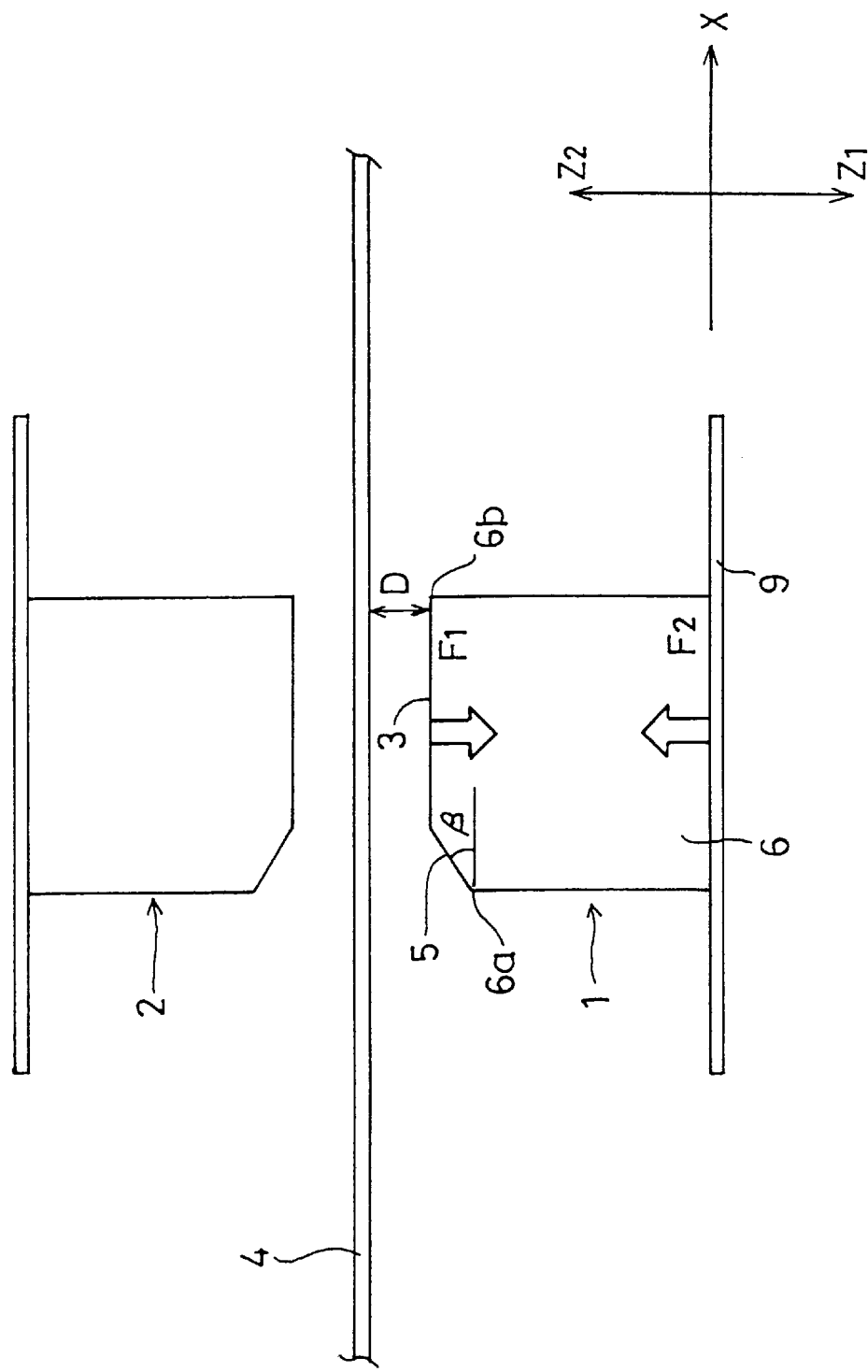

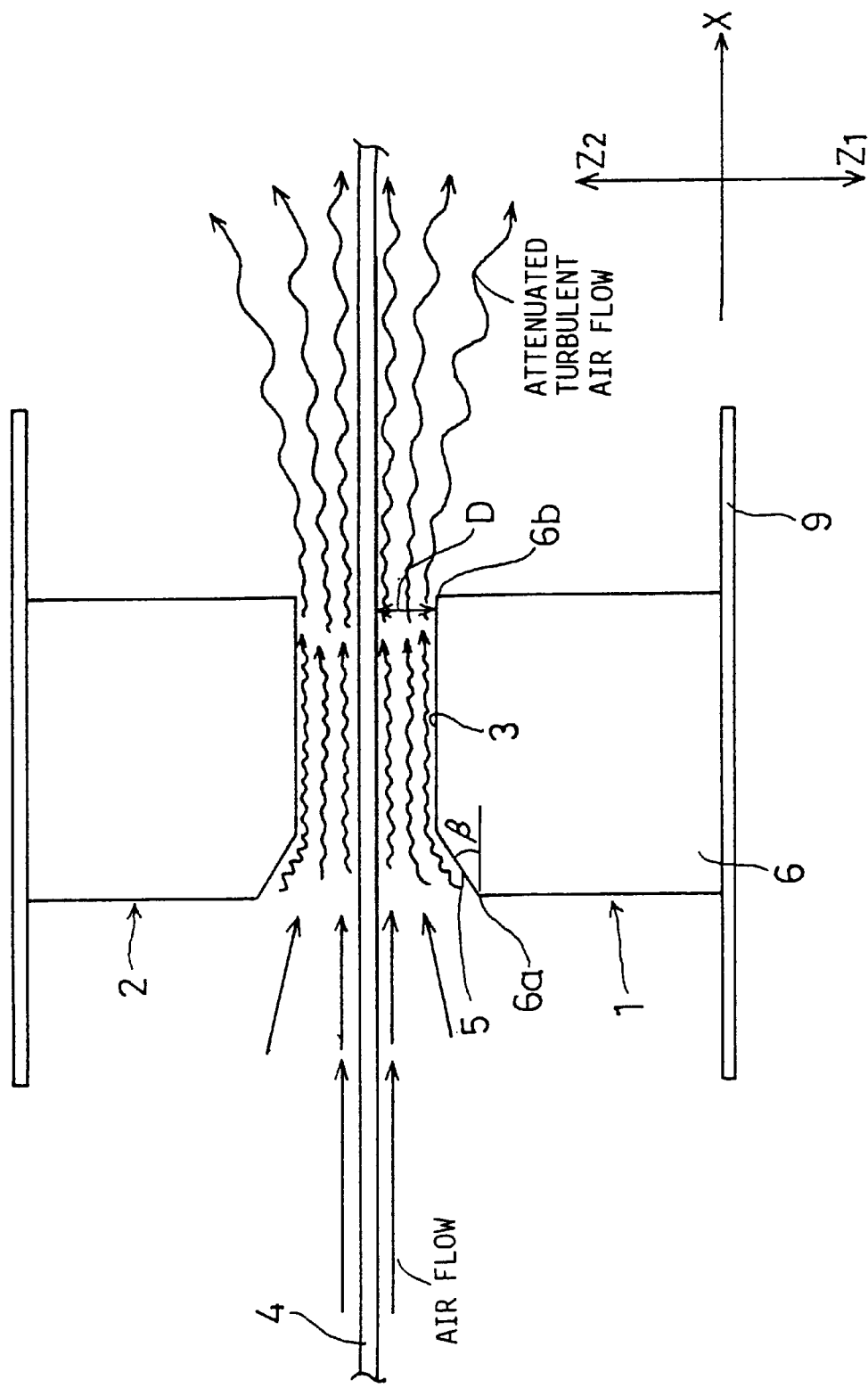

FIG. 7 PRIOR ART
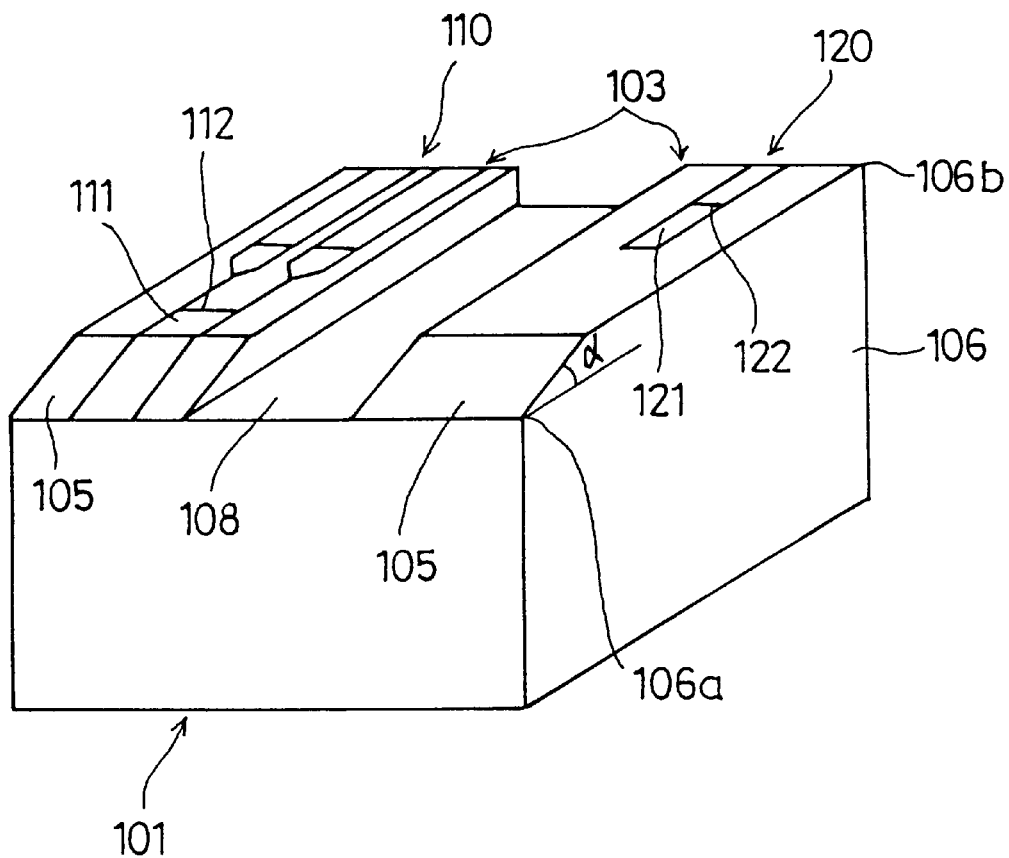
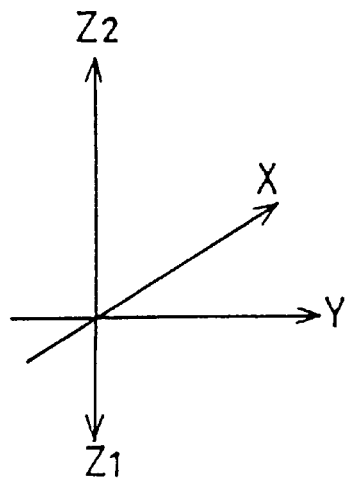

HEAD DEVICE HAVING AN IMPROVED AIR BEARING SURFACE TO ATTENUATE A TURBULENT AIR FLOW

BACKGROUND OF THE INVENTION (1) Field of the Invention

The present invention relates to a head device which is levitated from a storage medium by an air flow between the storage medium and the head device when accessing the storage medium.

Recently, the use of a large-capacity storage medium, such as a magnetic disk, has grown, and there is an increasing demand for a disk drive capable of speedily accessing the storage medium at a high recording density. For use in such a disk drive, a head device which is levitated from the storage medium by an air flow between the storage medium and the head device when accessing the storage medium is known.

(2) Description of the Related Art

In a magnetic disk drive, a magnetic disk is rotated at a high speed, and a read/write head accesses the disk to read information from or write information to the disk. A head device which is levitated from the disk by an air flow between the disk surface and an air bearing surface of the head device when accessing the disk, is used in the disk drive.

FIG. 7 is a perspective view of an existing head device 101 of the above type. FIG. 8 is a side view of the head device 101. The dimensions of the head device 101 shown in FIG. 7 and FIG. 8 are enlarged for the sake of simplicity of description.

As shown in FIG. 8, the head device 101 and another head device 201, which confront each other, are provided in an existing disk drive (not shown). The head device 201 has a configuration that is essentially the same as a configuration of the head device 101. Actually, the head device 101 and the head device 201 are vertically spaced apart from each other at a very small distance. However, the dimension of the distance between the two heads shown in FIG. 8 is enlarged for the sake of simplicity of illustration. The head device 101 constitutes a lower head of the disk drive, and the head device 201 constitutes an upper head of the disk drive. A magnetic disk 104 is placed between the lower head 101 and the upper head 201.

When the disk 104 is rotated in the direction "X" indicated in FIG. 8, the head device 101 is, as shown in FIG. 8, separated or levitated from the bottom surface of the disk 104 by an air flow between the rotating disk 104 and the head device 101. A distance of the head device 101 from the disk 104 is very small. The head device 101 extends in a radial direction of the disk 104 and is placed at an intermediate location of the disk 104. The side of the head device 101 when viewed in a direction parallel to the radial direction of the disk 104 passing the center of the disk 104 is illustrated in FIG. 8. In this condition, the head device 101 accesses the disk 104 to read information from or write information to the disk 104.

The head device 101 is configured to be used with two types of magnetic disk, and includes a low-speed head 110 and a high-speed head 120. Both the heads 110 and 120 are formed integrally with the head device 101.

As shown in FIG. 7, the head device 101 generally has a head portion 103 and a slider 106. The head portion 103 functions to read information from or write information to the disk 104. The slider 106 supports the head portion 103 thereon. The slider 106 is placed out of contact with the disk 104, and configured such that the slider 106 can maintain the head device 101, levitated from the disk 104 by the air flow, at a certain height. As shown in FIG. 8, the slider 106 is supported by a gimbal 102 of a thin plate material.

In the head device 101 of FIG. 7, the head portion 103 includes the low-speed head 110 and the high-speed head 120. Both the heads 110 and 120 are made of a magnetic material and formed as an air bearing surface of the slider 106. The low-speed head 110 and the high-speed head 120 are provided on the disk-side surface of the slider 106 along the side edges of the slider 106, and both extend in the disk rotation direction "X" of the disk 104 in parallel to each other. A central groove 108 extending in the disk rotation direction "X" is provided between the head 110 and the head 120. The head 110 has a core 111 and a gap 112, both formed thereon, and the gap 112 is formed in the middle of the core 111. The head 120 has a core 121 and a gap 122, both formed thereon, and the gap 122 is formed in the middle of the core 121.

In the disk drive, the disk 104 is rotated at a rotation speed that matches the type of the disk 104 loaded therein, and one of the low-speed head 110 and the high-speed head 120 of the head device 101 is selected in accordance with the type of the disk 104. The head device 101 magnetically reads information from or writes information to the disk 104 by using a magnetic field in the vicinity of the gap (either the gap 112 or the gap 122) of the selected head.

The slider 106 has a front edge 106a on an air-inlet side of the slider 106, and a rear edge 106b on an air-outlet side of the slider 106. A slanted surface 105 is provided along the front edge 106a of the slider 106. The slanted surface 105 is at a given angle "α" to a horizontal direction parallel to the disk rotation direction "X". The slanted surface 105 functions as an air flow guide surface which smoothly introduces an air flow from the disk 104 when rotated at a high speed.

Suppose that the disk 104 is rotated at a high speed and a flow of air is produced between the rotating disk 104 and the air bearing surfaces of the head device 101. The air passes through the central groove 108 between the head 110 and the head 120, and flows, at the same time, along the head portion 103 (both the head 110 and the head 120) in the disk rotation direction "X" from the front edge 106a to the rear edge 106b. Hence, the head device 101 is levitated from the disk 104 by the air flow between the disk 104 and the head device 101.

The head device 201 has the configuration that is essentially the same as the configuration of the head device 101 described above. Hence, when the disk 104 is rotated at a high speed, the head device 201 is levitated from the disk 104 by an air flow between the disk 104 and the head device 201 in the same manner.

FIG. 9 is a diagram for explaining a turbulent air flow produced at the rear end of the head device 101.

The air flowing from the rear end of the head device 101 is very likely to separate from the disk 104 because a reduced-pressure region 131 is created at the rear end of the head device 101. The air separating from the disk 104 is drawn to the reduced-pressure region 131, and a turbulent air flow 130 with vortices is produced as shown in FIG. 9.

In the above-described head device 101, the air flow is produced between the disk 104 and the head device 101 when the disk 104 is rotated at a high speed. The air flow passes through the head device 101 in the disk rotation direction "X" from the front edge 106a to the rear edge 106b. The reduced-pressure region 131 is created at the rear end of the head device 101. As described above, the air flow from the rear end of the head device 101 is very likely to separate from the disk 104, and the air separating from the disk 104 is drawn to the reduced-pressure region 131. The turbulent air flow 130 is produced at the rear end of the head device 101.

If the influence of the turbulent air flow 130 is significantly large, the rotating disk 104 and the head device 101 are subjected to vibrations by the turbulent air flow 130. If the disk 104 and the head device 101 are vibrated in the directions "Z1" and "Z2" indicated in the FIG. 9, by the turbulent air flow 130, the distance between the disk 104 and the gap 112 (or the gap 122) fluctuates when the head device 101 accesses the disk 104. Hence, in such a condition, the read/write operation of the head device 101 for the disk 104 becomes unstable and inaccurate. Further, the head device 101 may touch the disk 104 during the read/write operation because of the vibrations caused by the turbulent air flow 130. Hence, the disk 104 and the head device 101 are susceptible to damage during the read/write operation.

SUMMARY OF THE INVENTION

An object of the present invention is to provide an improved head device in which the above-described problems are eliminated.

Another object of the present invention is to provide a head device which has an improved air bearing surface to effectively attenuate a turbulent air flow on an air-outlet side of the head device such that a distance between the storage medium and the head device when accessing the storage medium can be maintained at a constant level.

The above-mentioned objects of the present invention are achieved by a head device including: a slider which is supported by a supporting plate; and a head portion which is provided on the slider and reads information from or writes information to a storage medium, the slider having an air bearing surface confronting the storage medium, the head portion formed on the air bearing surface of the slider, the head device being levitated from the storage medium by an air flow between the storage medium and the head device when accessing the storage medium, wherein the head device comprises an air flow disturbing means which attenuates a turbulent air flow produced on an air-outlet side of the slider when the storage medium is rotated at a speed above a predetermined speed, the air flow disturbing means maintaining a distance between the storage medium and the head device at a constant level.

In the head device of the present invention, the air flow disturbing means effectively attenuates a turbulent air flow on the rear side of the slider, and this makes the influence of the turbulent air flow on the storage medium and the head device adequately small. Because of the attenuated turbulent air flow, it is possible to prevent the storage medium and the head device from being subjected to vibrations. The head device of the present invention is effective in protecting the storage medium and the head portion against damage during the read/write operation. The distance between the storage medium and the head device when the head device accesses the storage medium can be maintained at a constant level even if the rotation speed of the storage medium is high. Accordingly, the head device of the present invention is effective in providing an accurate, stable read/write operation when speedily accessing the storage medium at a high recording density.

BRIEF DESCRIPTION OF THE DRAWINGS

Other objects, features and advantages of the present invention will be more apparent from the following detailed description when read in conjunction with the accompanying drawings in which:

FIG. 1 is a perspective view of a first embodiment of a head device of the present invention;

FIG. 2 is a side view of the first embodiment of the head device;

FIG. 4 is a diagram for explaining an attenuated turbulent air flow in the first embodiment of the head device;

FIG. 7 is a perspective view of an existing head device;

DETAILED DESCRIPTION OF THE PREFERRED EMBODIMENTS

A description will now be given of the preferred embodiments of the present invention with reference to the accompanying drawings.

Figure 3A:
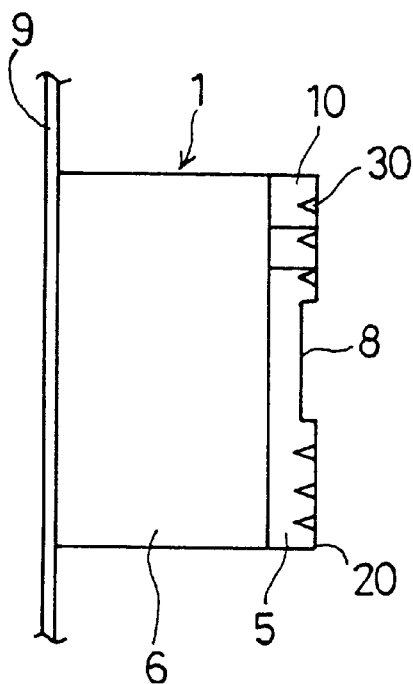
FIG. 3A, FIG. 3B and FIG. 3C are views of the first embodiment of the head device.
Figure 3B:
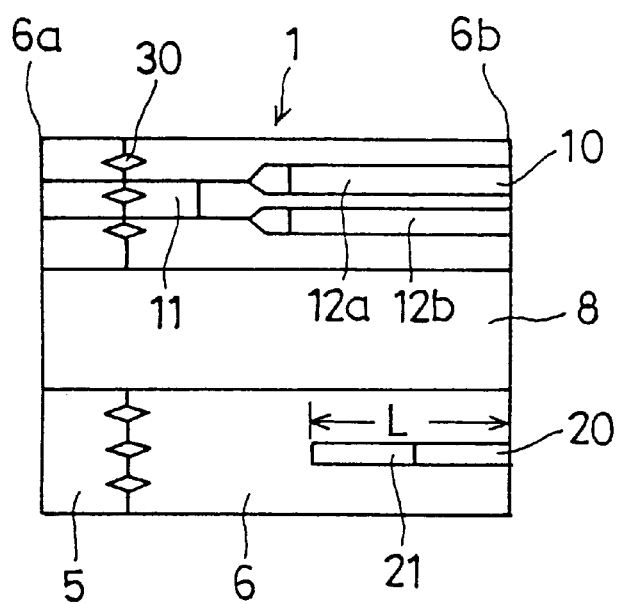
Figure 3C:
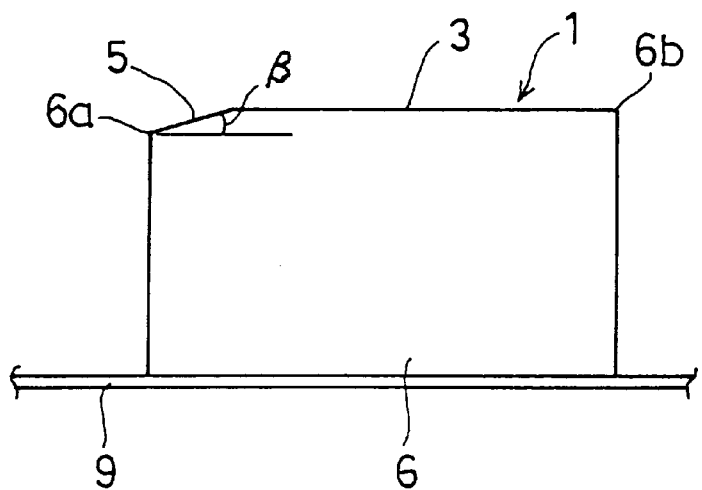

FIG. 1 is a perspective view of a first embodiment of a head device of the present invention. FIG. 2 is a side view of the head device 1 of FIG. 1. FIG. 3A, FIG. 3B and FIG. 3C are respectively a front view, a top view and a side view of the head device 1 of FIG. 1.

As shown in FIG. 1 through FIG. 3C, the dimensions of the head device 1 are enlarged for the sake of simplicity of description.

As shown in FIG. 2, the head device 1 and another head device 2, which confront each other, are provided in a disk drive (not shown). The head device 2 has a configuration that is essentially the same as a configuration of the head device 1. Actually, the head device 1 and the head device 2 are vertically spaced apart from each other at a very small distance. However, the dimension of the distance between the two heads shown in FIG. 2 is enlarged for the sake of simplicity of illustration. The head device 1 constitutes a lower head of the disk drive, and the head device 2 constitutes an upper head of the disk drive. A magnetic disk 4 is placed between the lower head 1 and the upper head 2. Hereinafter, the magnetic disk 4 will be called the disk 4.

When the disk 4 is rotated in the direction "X" indicated in FIG. 2, the head device 1 is, as shown in FIG. 2, separated from the bottom surface of the disk 4 by an air flow between the rotating disk 4 and the head device 1. A distance of the head device 1 from the disk 4 is very small. The head device 1 extends in a radial direction of the disk 4 and is placed at an intermediate location of the disk 4. The side of the head device 1 when viewed in a direction parallel to the radial direction of the disk 4 passing the center of the disk 4 is illustrated in FIG. 2. In this condition, the head device 1 accesses the disk 4 to read information from or write information to the disk 4.

As shown in FIG. 1, the head device 1 generally has a head portion 3 and a slider 6. The head portion 3 functions to read information from or write information to the disk 4. The slider 6 supports the head portion 3 thereon. The slider 6 is placed out of contact with the disk 4, and configured such that the slider 6 can maintain the head device 1, levitated from the disk 4 by the air flow, at a certain height.

As shown in FIG. 2, the slider 6 is supported by a gimbal 2 of a thin plate material.

The slider 6 is prepared to have mirror-finished surfaces by performing precision machining. The slider 6 has a front edge 6a on an air-inlet side of the slider 6, and a rear edge 6b on an air-outlet side of the slider 6. A slanted surface 5 is provided extending from the front edge 6a of the slider 6. The slanted surface 5 is at a given angle "β" to a horizontal direction parallel to the disk rotation direction "X". The slanted surface 5 functions as an air flow guide surface which smoothly introduces an air flow in the disk rotation direction "X" when the disk 4 is rotated at a high speed above a predetermined speed.

In the head device 1 of FIG. 1, the head portion 3 includes a low-speed head 10 and a high-speed head 20. The head device 1 is configured to be used with two types of magnetic disk, and includes the low-speed head 10 and the high-speed head 20. The head 10 and the head 20 are both made of a magnetic material, and both formed as an air bearing surface of the slider 6. The head 10 and the head 20 are provided on the disk-side surface of the slider 6 along the side edges of the slider 6, and both extend in the disk rotation direction "X" of the disk 4 in parallel to each other. A central groove 8 extending in the disk rotation direction "X" is provided between the head 10 and the head 20. The central groove 8 is formed as an air bearing surface of the slider 6.

The low-speed head 10 includes a read/write core 11 and a pair of erase cores 12a and 12b. The read/write core 11 is used to read information from or write information to a low-speed type magnetic disk. The erase cores 12a and 12b are used to erase the information recorded in the disk 4. The read/write core 11 extends in the disk rotation direction "X" from the front edge 6a to the rear edge 6b. A gap 13 is formed at an intermediate position of the read/write core 11. The erase cores 12a and 12b are provided on both sides of the rear portion of the read/write core 11, and extend in the disk rotation direction "X" from the middle position to the rear edge 6b. A gap 14a is formed at an intermediate position of the erase core 12a, and a gap 14b is formed at an intermediate position of the erase core 12b.

The high-speed head 20 includes a read/write core 21 and a gap 22. The read/write core 21 is used to read information from or write information to a high-speed type magnetic disk. The read/write core 21 extends in the disk rotation direction "X" from the rear edge 6b by a given distance "L". Similar to the low-speed head 10, the gap 22 is formed at an intermediate position of the read/write core 21.

In the disk drive, the disk 4 is rotated at a rotation speed that matches the type of the disk 4 loaded therein, and one of the low-speed head 10 and the high-speed head 20 of the head device 1 is selected in accordance with the type of the disk 4. The head device 1 magnetically reads information from or writes information to the disk 4 by using a magnetic field in the vicinity of the gap (the gap 13 or the gap 22) of the selected head. Further, the head device 1 magnetically erases the information recorded in the disk 4 by using a magnetic field in the vicinity of the gaps 14a and 14b of the head 10.

In order to achieve the functions of the head device 1, the read/write cores 11 and 21 and the erase cores 12a and 12b are prepared from a magnetic material, such as ferrite. It is necessary that the magnetic material of these cores has a high magnetic permeability, a suitability for precision machining, an adequate temperature resistance and an adequate humidity resistance.

Suppose that the disk 4 is rotated at a high speed above the predetermined speed and a flow of air is produced between the rotating disk 4 and the air bearing surfaces of the head device 1. The air passes through the central groove 8 between the head 10 and the head 20, and, at the same time, flows along the head portion 3 (both the head 10 and the head 20) in the disk rotation direction "X" from the front edge 6a to the rear edge 6b. Hence, the head device 1 is levitated from the disk 4 by the air flow between the disk 4 and the head device 1. As shown in FIG. 2, a levitating force "F1" is exerted on the head device 1 in the direction "Z1" by the air flow. The slider 6 of the head device 1 is supported on the gimbal 6, and a reaction "F2" to the levitating force "F1" is exerted on the head device 1 in the direction "Z2" by the gimbal 6 or a supporting plate (not shown) of the disk drive. The levitating force "F1" and the reaction "F2" are in equilibrium in the head device 1, and a distance "D" between the head device 1 and the disk 4 is maintained at a constant level.

The head device 2 has the configuration that is essentially the same as the above-described configuration of the head device 1. Hence, when the disk 4 is rotated at a high speed above the predetermined speed, the head device 2 is levitated from the disk 4 by an air flow between the disk 4 and the head device 2 in the same manner.

In the present embodiment of the head device 1, a plurality of small notches 30 are formed on the front side of the air bearing surface of the head 10 at peripheral positions of the slanted surface 5 extending to the cores 11, 12a and 12b as well as on the front side of the air bearing surface of the head 20 at peripheral positions of the slanted surface 5 extending to the core 21. The notches 30 are aligned in a row parallel to the radial direction "Y" of the disk 4, and the notches 30 on the head 10 are equally spaced apart from one another, and the notches 30 on the head 20 are equally spaced apart from one another.

As shown in FIG. 3B, the notches 30 on the air bearing surfaces of the head device 1 of the present embodiment are formed in the shape of a rhombus. As shown in FIG. 3A, each notch 30 has a V-shaped cross-section. The air passing through the notches 30 moves more slowly than the air passing through the other areas apart from the notches 30. The notches 30 have a braking effect on the air flowing along the head 10 and the head 20 in the disk rotation direction "X". The notches 30 on the air bearing surfaces of the head device 1 of the present embodiment act to attenuate a turbulent air flow on the air-outlet side of the slider 6.

In the present embodiment, the head device 1 includes the notches 30 on the air bearing surfaces of the head 10 and the head 20, and the notches 30 act to attenuate a turbulent air flow produced on the air-outlet side of the slider 6 when the disk 4 is rotated at a high speed above the predetermined speed.

In the above-described embodiment, the notches 30 are aligned in a row parallel to the radial direction "Y" of the disk 4, the notches 30 on the head 10 are equally spaced apart from one another, and the notches 30 on the head 20 are equally spaced apart from one another. It is preferred that the arrangement, the configuration and/or the total number of the notches 30 in the head device 1 are suitably determined by taking account of the rotation speed of the disk 4, the materials of the head device 1 and the disk 4, and the operating conditions of the disk drive.

As the rotation speed of a storage medium becomes high and the structure of a head device becomes complicated in order to suit the demand for a disk drive capable of speedily accessing the storage medium at a high recording density, it is required to perform a special precision machining or forming of the slider 6, the cores 11, 12a, 12b and 21, and the notches 30 at a high accuracy. A special machining tool or a photolithographic process may be used to perform the required precision machining or forming.

FIG. 4 is a diagram for explaining an attenuated turbulent air flow at the rear end of the head device 1 of FIG. 1.

In the above-described head device 1, an air flow is produced between the disk 4 and the head device 1 when the disk 4 is rotated at a high speed above the predetermined speed. The air flow passes through the head device 1 in the disk rotation direction "X" from the front edge 6a to the rear edge 6b.

Figure 9:
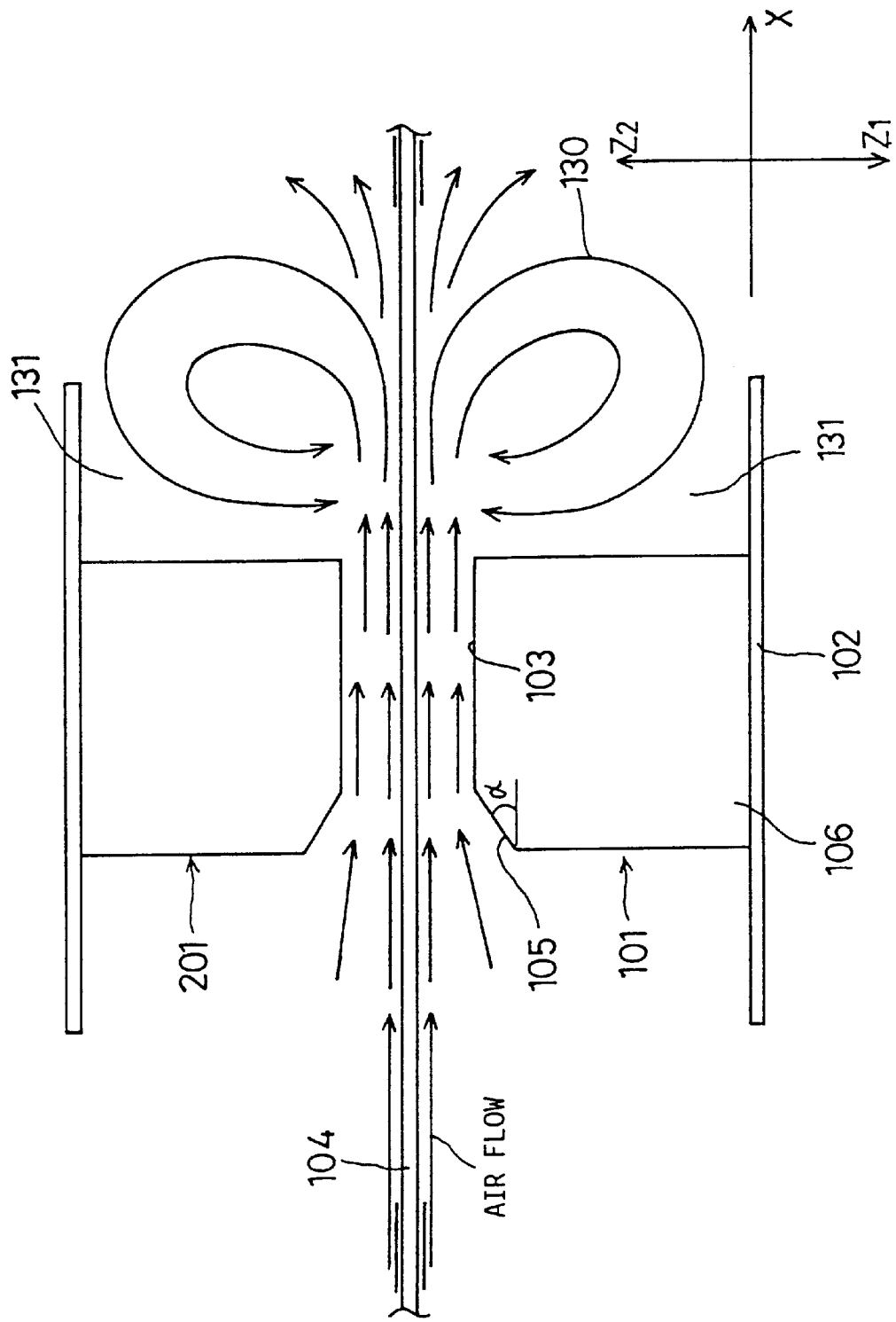
FIG. 9 is a diagram for explaining a turbulent air flow produced on a rear side of the existing head device.

If the air flowing along the slanted surface 5 is taken into consideration, the air passing through the notches 30 moves more slowly than the air passing through the other areas apart from the notches 30 due to the viscosity of the air. The notches 30 on the head device 1 have a braking effect on the air flowing along the air bearing surfaces of the head 10 and the head 20 in the disk rotation direction "X". As shown in FIG. 4, the air flow in the area between the disk 4 and the head portion 3 is not smooth and has an uneven motion due to the notches 30. This is different from the laminar air flow in the case of the head device 101 shown in FIG. 9. The uneven motion reduces the separating tendency of the air flowing from the rear end of the head device 1 and separating from the disk 4. Hence, the notches 30 on the air bearing surfaces of the head device 1 act to attenuate a turbulent air flow on the air-outlet side of the slider 6. The air from the rear end of the head device 1 flows generally along the disk surface.

The head device 2 has the configuration that is essentially the same as the configuration of the head device 1. Hence, when the disk 4 is rotated at a high speed above the predetermined speed, the head device 2 acts to attenuate a turbulent air flow on the air-outlet side of the head device 2 in the same manner.

As described above, in the present embodiment, the notches 30 on the air bearing surfaces of the head device 1 effectively attenuate a turbulent air flow at the air-outlet end of the head device 1, and this makes the influence of the turbulent air flow on the disk 4 and the head device 1 adequately small. Because of the attenuated turbulent air flow, it is possible to prevent the disk 4 and the head device 1 from being subjected to vibrations in the directions "Z1" and "Z2". The head device 1 of the present embodiment is effective in protecting the disk 4 and the head portion 3 against damage during the read/write operation. The distance D between the disk 4 and the head device 1 (or the gaps 13, 14a, 14b and 22) when the head device 1 accesses the disk 4 can be maintained at a constant level even if the rotation speed of the disk 4 is high. Accordingly, the head device 1 of the present embodiment is effective in providing an accurate, stable read/write operation when the head device 1 speedily accesses the disk 4 at a high recording density.

Figure 5A:
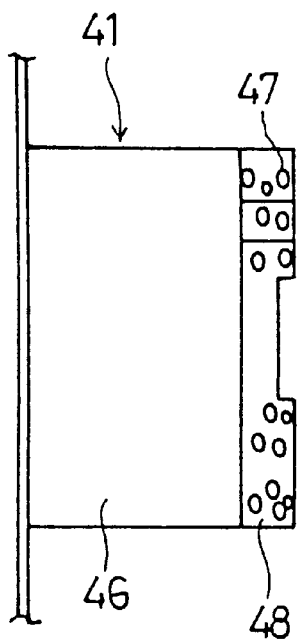
FIG. 5A, FIG. 5B and FIG. 5C are views of a second embodiment of the head device of the present invention.
Figure 5B:
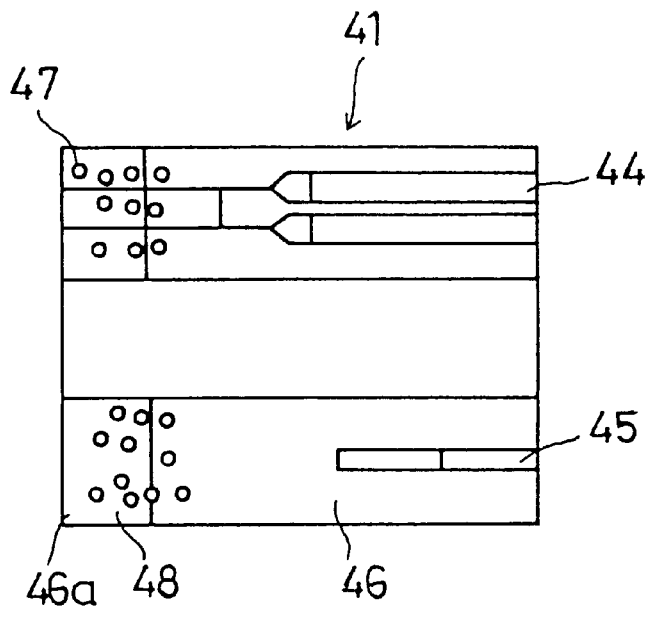
Figure 5C:
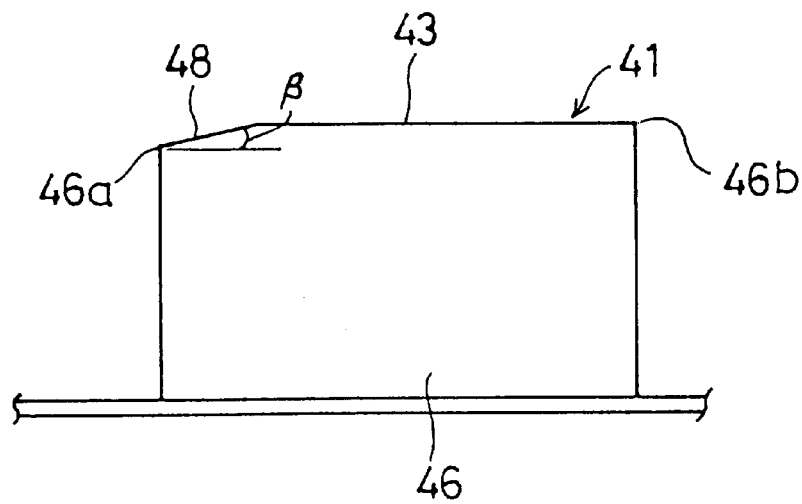

Next, FIG. 5A, FIG. 5B and FIG. 5C are respectively a front view, a top view and a side view of a second embodiment of the head device of the present invention.

Similar to the embodiment of FIG. 3A through FIG. 3C, a head device 41 of the present embodiment and another head device, which confront each other, are provided in a disk drive (not shown). The other head device has a configuration that is essentially the same as a configuration of the head device 41. Actually, the head device 41 and the other head device are vertically spaced apart from each other at a very small distance. The head device 41 constitutes a lower head of the disk drive, and the other head device constitutes an upper head of the disk drive. The disk 4 is placed between the lower head and the upper head.

When the disk 4 is rotated, the head device 41 is separated from the surface of the disk 4 by an air flow between the rotating disk 4 and the head device 41. A distance of the head device 41 from the disk 4 is very small. In this condition, the head device 41 accesses the disk 4 to read information from or write information to the disk 4.

As shown in FIG. 5A through FIG. 5C, the head device 41 generally has a head portion 43 and a slider 46. The head portion 43 functions to read information from or write information to the disk 4. The slider 46 supports the head portion 43 thereon. The slider 46 is placed out of contact with the disk 4, and configured such that the slider 46 can maintain the head device 41, levitated from the disk 4 by the air flow, at a certain height. As shown in FIG. 5C, the slider 46 is supported by a gimbal of a thin plate material.

The slider 46 is prepared to have mirror-finished surfaces by performing precision machining. The slider 46 has a front edge 46a on an air-inlet side of the slider 46, and a rear edge 46b on an air-outlet side of the slider 46. A slanted surface 48 extending from the front edge 46a of the slider 46 is provided. The slanted surface 48 is at a given angle "β" to a horizontal direction parallel to the disk rotation direction. The slanted surface 48 functions as an air flow guide surface which smoothly introduces an air flow in the disk rotation direction when the disk 4 is rotated at a high speed above the predetermined speed.

In the head device 41 of FIG. 1, the head portion 43 includes a low-speed head 44 and a high-speed head 45. The head device 41 is configured to be used with two types of magnetic disk, and includes the low-speed head 44 and the high-speed head 45. Both the heads 44 and 45 are made of a magnetic material and formed integrally with the head device 41. The head 44 and the head 45 are provided on the disk-side surface of the slider 46 along the side edges of the slider 46, and both extend in the disk rotation direction of the disk 4 in parallel to each other. An air bearing surface is formed on each of the head 44 and the head 45.

Other structure of the head portion 43 in the head device 41 of the present embodiment is essentially the same as that of the head portion 3 of the embodiment of FIG. 3A through FIG. 3C, and a description thereof will be omitted.

In the present embodiment of the head device 41, a plurality of small dimples 47 are formed on the front side of the air bearing surface of the head 44 at peripheral positions of the slanted surface 48 extending to the rear side of the air bearing surface of the head 44 as well as on the front side of the air bearing surface of the head 45 at peripheral positions of the slanted surface 48 extending to the rear side of the air bearing surface of the head 45. The dimples 47 are formed on the air bearing surfaces of the head portion 43 by performing shot peening. When the shot peening is performed, small chips of steel or the like are blown to and hit at a high velocity the air bearing surfaces of the head portion 43 at the relevant positions to form the dimples 47 thereon. It is preferred that the specific gravity, the hardness and/or the hitting speed of the chips used in the shot peening are suitably determined by taking account of the rotation speed of the disk 4, the material of the head device 41, and the operating conditions of the disk drive.

In the head device 41 of the present embodiment, an air flow is produced between the disk 4 and the head device 41 when the disk 4 is rotated at a high speed above the predetermined speed. The air flow passes through the head device 41 in the disk rotation direction from the front edge 46a to the rear edge 46b.

If the air flowing along the slanted surface 48 is taken into consideration, the air passing through the dimples 47 moves more slowly than the air passing through the other areas apart from the dimples 47 due to the viscosity of the air. The dimples 47 on the head device 41 have a braking effect on the air flowing along the air bearing surfaces of the head 44 and the head 45 in the disk rotation direction. The air flow in the area between the disk 4 and the head portion 43 is not smooth and has an uneven motion due to the dimples 47. The uneven motion reduces the separating tendency of the air flowing from the rear end of the head device 41 and separating from the disk 4. Hence, the dimples 47 on the air bearing surfaces of the head device 41 act to attenuate a turbulent air flow on the air-outlet side of the slider 46. The air from the rear end of the head device 41 flows generally along the disk surface.

As described above, in the present embodiment, the dimples 47 on the air bearing surfaces of the head device 41 effectively attenuate a turbulent air flow on the air-outlet side of the slider 46, and this makes the influence of the turbulent air flow on the disk 4 and the head device 41 adequately small. Because of the attenuated turbulent air flow, it is possible to prevent the disk 4 and the head device 41 from being subjected to vibrations. The head device 41 of the present embodiment is effective in protecting the disk 4 and the head portion 43 against damage during the read/write operation. The distance D between the disk 4 and the head device 41 when the head device 41 accesses the disk 4 can be maintained at a constant level even if the rotation speed of the disk 4 is high. Accordingly, the head device 41 of the present embodiment is effective in providing an accurate, stable read/write operation when the head device 41 speedily accesses the disk 4 at a high recording density.

Figure 6A:
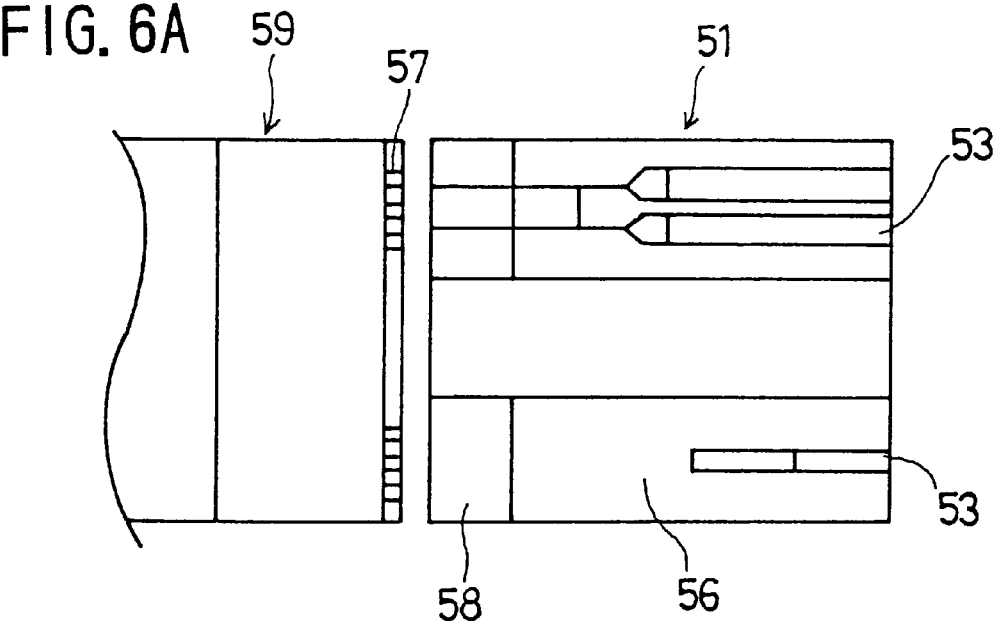
FIG. 6A and FIG. 6B are views of a third embodiment of the head device of the present invention.
Figure 6B:
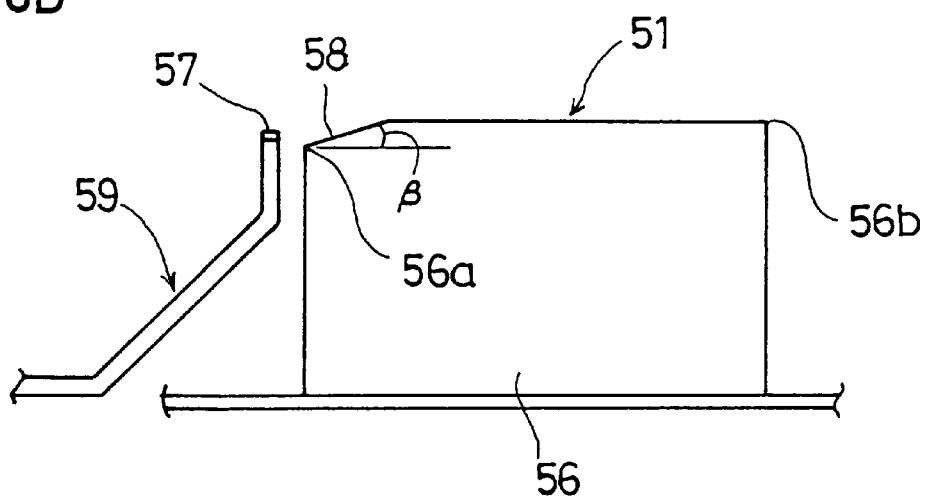
Figure 8:
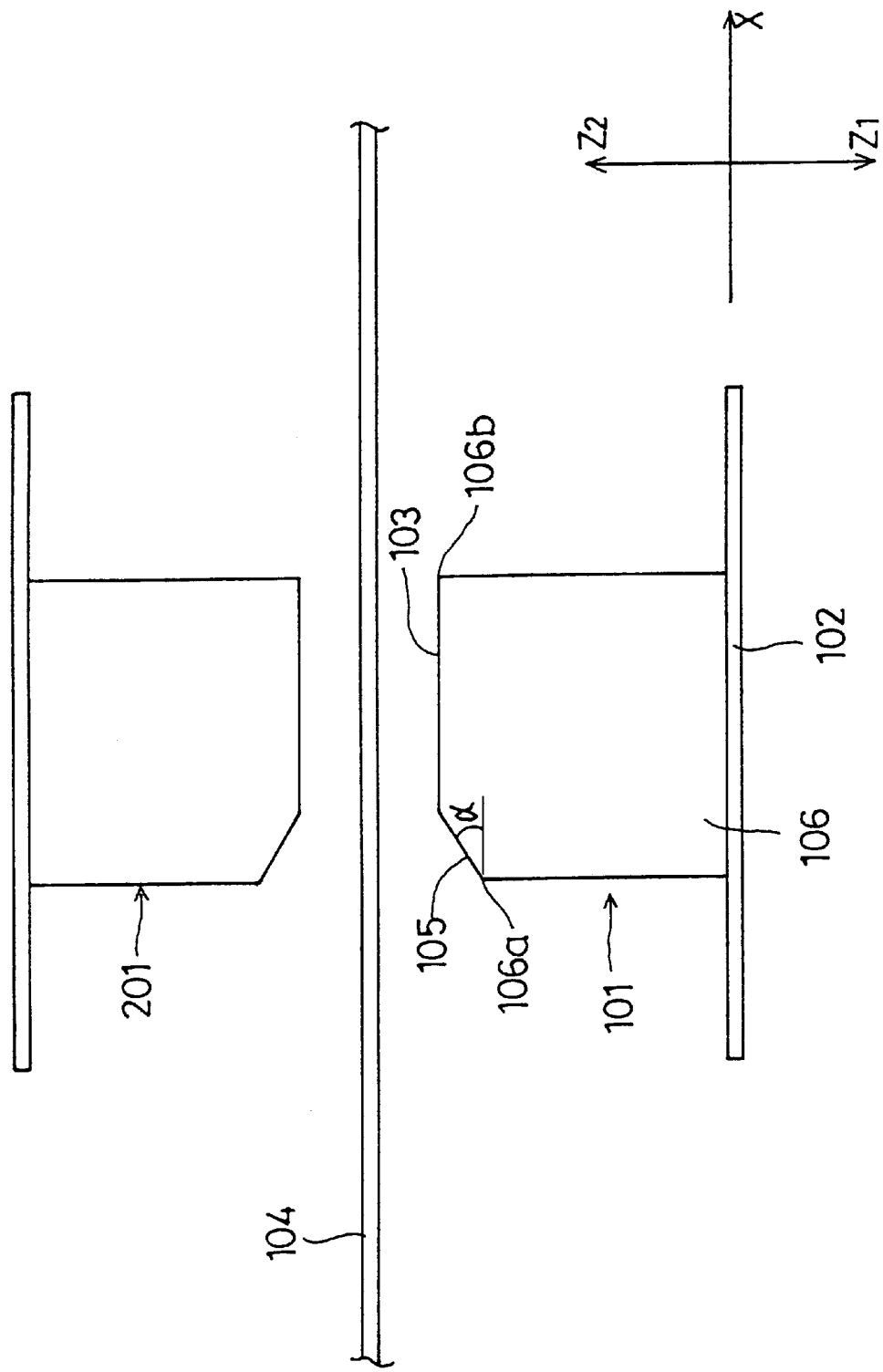
FIG. 8 is a side view of the existing head device.

Next, FIG. 6A and FIG. 6B are respectively a top view and a side view of a third embodiment of the head device of the present invention.

Similar to the embodiment of FIG. 3A through FIG. 3C, a head device 51 of the present embodiment and another head device, which confront each other, are provided in a disk drive (not shown). The other head device has a configuration that is essentially the same as a configuration of the head device 51. Actually, the head device 51 and the other head device are vertically spaced apart from each other at a very small distance. The head device 51 constitutes a lower head of the disk drive, and the other head device constitutes an upper head of the disk drive. The disk 4 is placed between the lower head and the upper head.

When the disk 4 is rotated, the head device 51 is separated from the surface of the disk 4 by an air flow between the rotating disk 4 and the head device 51. A distance of the head device 51 from the disk 4 is very small. In this condition, the head device 51 accesses the disk 4 to read information from or write information to the disk 4.

As shown in FIG. 6A and FIG. 6B, the head device 51 generally has head portions 53, a slider 56 and a slit plate 59. The head portions 53 function to read information from or write information to the disk 4. The slider 56 supports the head portions 53 thereon. The slider 56 is placed out of contact with the disk 4, and configured such that the slider 56 can maintain the head device 51, levitated from the disk 4 by the air flow, at a certain height. As shown in FIG. 6B, the slider 56 is supported by a gimbal of a thin plate material.

The slider 56 is prepared to have mirror-finished surfaces by performing precision machining. The slider 56 has a front edge 56a on an air-inlet side of the slider 56, and a rear edge 56b on an air-outlet side of the slider 56. A slanted surface 58 extending from the front edge 56a of the slider 56 is provided. The slanted surface 58 is at a given angle "β" to a horizontal direction parallel to the disk rotation direction.

In the head device 51 of the present embodiment, the head portions 53 are both formed as an air bearing surface of the slider 56. Other structure of the head portions 53 in the head device 51 of the present embodiment is essentially the same as that of the head portion 3 of the embodiment of FIG. 3A through FIG. 3C, and a description thereof will be omitted.

In the head device 51 of the present embodiment, the slit plate 59 is located at such a position that the air flow between the disk 4 and the head device 51 is not directly influenced by the slit plate 59. Only a leading edge of the slit plate 59 is provided adjacent to the slanted surface 58 of the slider 56. The slanted surface 58 functions as an air flow guide surface which smoothly introduces an air flow from the disk 4 when rotated at a high speed above the predetermined speed. A plurality of small slits 57 are formed on the leading edge of the slit plate 59. The slits 57 confront the front side of the air bearing surfaces of the head portions 53 at which the slanted surface 58 of the slider 56 is located. It is preferred that the size and/or the total number of the slits 57 are suitably determined by taking account of the rotation speed of the disk 4, the material of the head device 51, and the operating conditions of the disk drive.

In the head device 51 of the present embodiment, an air flow is produced between the disk 4 and the head device 51 when the disk 4 is rotated at a high speed above the predetermined speed. The air flow passes through the head device 51 in the disk rotation direction from the front edge 56a to the rear edge 56b.

If the air before entering the slanted surface 5 is taken into consideration, the air passing through the slits 57 moves more slowly than the air passing through the other areas apart from the slits 57 due to the viscosity of the air. The slits 57 on the head device 51 have a braking effect on the air flowing along the air bearing surfaces of the head portions 53 in the disk rotation direction. The air flow in the area between the disk 4 and the head portions 53 is not smooth and has an uneven motion due to the slits 57. The uneven motion reduces the separating tendency of the air flowing from the rear end of the head device 51 and separating from the disk 4. Hence, the slits 57 on the head device 51 act to attenuate a turbulent air flow on the air-outlet side of the slider 56. The air from the rear end of the head device 51 flows generally along the disk surface.

As described above, in the present embodiment, the slits 57 on the head device 51 effectively attenuate a turbulent air flow on the air-outlet side of the slider 56, and this makes the influence of the turbulent air flow on the disk 4 and the head device 51 adequately small. Because of the attenuated turbulent air flow, it is possible to prevent the disk 4 and the head device 51 from being subjected to vibrations. The head device 51 of the present embodiment is effective in protecting the disk 4 and the head portion 43 against damage during the read/write operation. The distance D between the disk 4 and the head device 51 when the head device 51 accesses the disk 4 can be maintained at a constant level even if the rotation speed of the disk 4 is high. Accordingly, the head device 51 of the present embodiment is effective in providing an accurate, stable read/write operation when the head device 51 speedily accesses the disk 4 at a high recording density.

Further, the present invention is not limited to the above-described embodiments, and variations and modifications may be made without departing from the scope of the present invention.

The present invention is based on Japanese priority application No. 9-308807, filed on Nov. 11, 1997, the entire contents of which are hereby incorporated by reference.

What is claimed is:

1. A head device including a slider supported by a supporting plate, and a head portion provided on the slider for reading information from or writing information to a storage medium, the slider having an air bearing surface confronting the storage medium, the head portion formed on the air bearing surface of the slider, the head device being levitated from the storage medium by an air flow between the storage medium and the head device when accessing the storage medium, wherein said head device comprises air flow disturbing means for attenuating a turbulent air flow produced on an air-outlet side of the slider when the storage medium is rotated at a speed above a predetermined speed, the air flow disturbing means maintaining a distance between the storage medium and the head device at a constant level.

2. The head device according to claim 1, wherein the slider has a slanted surface at an air-inlet side thereof, and the air flow disturbing means comprises a plurality of notches formed at peripheral positions of the slanted surface extending to the air bearing surface of the slider.

3. The head device according to claim 2, wherein the notches are aligned in a row parallel to a radial direction of the storage medium, and the notches are equally spaced apart from one another.

4. The head device according to claim 1, wherein the slider has a slanted surface at an air-inlet side thereof, and the air flow disturbing means comprises a plurality of dimples formed at peripheral positions of the slanted surface extending to the air bearing surface of the slider.

5. The head device according to claim 1, wherein the slider has a slanted surface at an air-inlet side thereof, and the air flow disturbing means comprises:

a slit plate provided at such a position that the air flow between the storage medium and the head device is not directly influenced by the slit plate, the slit plate having a leading edge adjacent to the slanted surface of the slider; and a plurality of slits formed on the leading edge of the slit plate, the slits confronting the slanted surface extending to the air bearing surface of the slider.

6. The head device according to claim 1, wherein the head portion includes a first head and a second head provided on the slider along side edges of the slider, both the first head and the second head extending in a rotation direction of the storage medium in parallel to each other, and each of the first head and the second head being formed as an air bearing surface.

7. The head device according to claim 6, wherein the head portion includes a central groove extending in the rotation direction of the storage medium and provided between the first head and the second head, the central groove being formed as an air bearing surface.

8. The head device according to claim 1, wherein the storage medium is a magnetic disk, and the head magnetically reads information from or writes information to the magnetic disk when the magnetic disk is rotated.

* * * * *